(12) United States Patent
Hu et al.

(10) Patent No.: US 7,645,832 B2
(45) Date of Patent: Jan. 12, 2010

(54) USE OF METAL OXIDES AND SALTS TO ENHANCE ADHESION TO STEELS

(75) Inventors: Weiguo Hu, Hudson, OH (US); Jim Lee Johnson, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 318 days.

(21) Appl. No.: 11/371,030

(22) Filed: Mar. 8, 2006

(65) Prior Publication Data

US 2007/0213461 A1    Sep. 13, 2007

(51) Int. Cl.
*C08L 51/04* (2006.01)
*C08L 53/02* (2006.01)

(52) U.S. Cl. .............. 525/74; 525/98; 525/99; 525/245; 525/248; 525/254

(58) Field of Classification Search .......... 525/74, 525/98, 99, 245, 248, 254
See application file for complete search history.

(56) References Cited

U.S. PATENT DOCUMENTS

| | | | | |
|---|---|---|---|---|
| 4,130,534 | A | 12/1978 | Coran et al. | 260/33.6 AQ |
| 4,130,535 | A | 12/1978 | Coran et al. | 260/33.6 AQ |
| 4,311,628 | A * | 1/1982 | Abdou-Sabet et al. | 524/447 |
| 4,689,111 | A | 8/1987 | Chan et al. | 156/643 |
| 4,853,300 | A | 8/1989 | Pike | 428/702 |
| 4,957,968 | A | 9/1990 | Adur et al. | 525/74 |
| 5,093,203 | A | 3/1992 | Mowrey et al. | 428/462 |
| 6,251,977 | B1 | 6/2001 | Georget et al. | |
| 6,355,599 | B1 | 3/2002 | Zahora et al. | 505/233 |
| 6,444,724 | B1 | 9/2002 | Stangel et al. | 523/116 |
| 6,503,984 | B2 | 1/2003 | Johnson et al. | 525/70 |
| 2002/0010265 | A1 | 1/2002 | Johnson et al. | |
| 2002/0011281 | A1 | 1/2002 | Geke et al. | 148/260 |
| 2003/0119988 | A1 * | 6/2003 | Johnson et al. | 525/191 |
| 2005/0143497 | A1 | 6/2005 | Butler et al. | 524/3 |
| 2006/0100347 | A1 * | 5/2006 | Ouhadi et al. | 524/502 |
| 2006/0100377 | A1 * | 5/2006 | Ouhadi | 525/191 |
| 2007/0134497 | A1 * | 6/2007 | Crafton et al. | 428/411.1 |

FOREIGN PATENT DOCUMENTS

| | | |
|---|---|---|
| EP | 0 420 662 | 4/1991 |
| EP | 0 846 744 | 6/1998 |
| WO | WO 01/79371 | 10/2001 |
| WO | WO 03/064523 | 8/2003 |
| WO | 2007/102949 | 9/2007 |

OTHER PUBLICATIONS

G. T. Carpenter in Rubber Chemistry and Technology, vol. 51 (1978), pp. 788-798, entitled "The Effect of Zinc Oxide Particle Size and Shape on Adhesion of Rubber to Brass-Coated Steel Radial Tire Cord".

"Adhesion of Modified PE/EPDM Blends to Steel", by Viksne et al, in J.M.S.—Pure Appl. Chem., A35(7&8), pp. 1165-1185 (1998).

* cited by examiner

*Primary Examiner*—Jeffrey C Mullis

(57) ABSTRACT

A thermoplastic elastomer having adhesion to steels, where the thermoplastic elastomer includes a dynamically crosslinked rubber, from more than 2.0 to 10 parts of a metal oxide or salt, and from 10 to 200 parts by weight of a functionalized polyolefin having pendant polar functional groups, where the polar functional groups are present at a level of 0.5 to 3.5 mole percent of the total repeating units of said functionalized polyolefin and the functionalized polyolefin is derived from polymerizing at least one monoolefin to form a semicrystalline polymer or is derived from hydrogenating the polydiene blocks of a block copolymer, and where the parts by weight are based on 100 parts by weight of crosslinked rubber.

14 Claims, No Drawings

USE OF METAL OXIDES AND SALTS TO ENHANCE ADHESION TO STEELS

BACKGROUND OF INVENTION

The present invention is directed to the use of metal oxides and salts in combination with anhydride/acid modified polymers to enhance adhesion of thermoplastic elastomers to steels such as stainless steel and cold-rolled steel.

Polyolefins and thermoplastic elastomers rich in polyolefins have traditionally had poor adhesion to metal surfaces, including textile fibers surfaces. Experiments with thermoplastic vulcanizates (TPV), a subset of thermoplastic elastomers (TPE), using formulations similar to those of U.S. Pat. Nos. 4,130,534 and 4,130,535 resulted in peel strengths of only 0.5 to 1.0 pounds per linear inch (pli) between the TPV and textile fibers after melt processing the TPV to the textile fibers. The industrial hose and belting markets generally require a peel strength of at least 8 to 12 pli for candidate matrix materials for fiber reinforced hoses and belting. While polyolefins and TPVs from polyolefins have benefits over plasticized polyvinyl chloride resin (in terms of chemical resistance and physical properties after aging) and over crosslinked rubbers (in terms of processability and physical properties after aging) their use has been limited due to low adhesion values (low peel strengths).

Metal oxides such as ZnO have been incorporated into rubber and TPE blends in low amounts, usually 2.0 parts or less by weight based upon 100 parts by weight of the rubber, but such use does not significantly promote the bonding of the TPE to metals. An article by G. T. Carpenter in Rubber Chemistry and Technology, Vol. 51 (1978), pages 788-798, entitled "The Effect of Zinc Oxide Particle Size and Shape on Adhesion of Rubber to Brass-Coated Steel Radial Tire Cord", reported the use of ZnO in amounts ranging from 2 to 11 phr, but the substrates are brass, and so they must be metals that contain metallic zinc, and the bonding process is related to thermoset rubber. Bonding between substrates and thermoset rubbers occurs during the curing process, during which chemical crosslinks are formed between the substrates and the rubber. On the other hand, for bonding between substrates and thermoplastic elastomers, the cure either has completed before the bonding process, such is the case for TPV's, or does not occur at all in the case of physically crosslinked TPE's.

Other teachings, such as International publication WO 01/79371 to Kim, suggest the use of zinc diacrylate or dimethacrylate to improve the adhesion of thermosetting compositions to hydrophilic metal surfaces, although only copper foil is exemplified. An article "Adhesion of Modified PE/EPDM Blends to Steel", by Viksne et al, in J.M.S.—Pure Appl. Chem., A35(7&8), pp. 1165-1185 (1998) teaches the use of dicumyl peroxide in the presence of coagent, zinc diacrylate, to increase adhesion against steel, compared to dicumyl peroxide alone. These studies are also related to bonding between thermoset rubber and substrates.

Efforts have been made to improve adhesion. For example, U.S. Pat. No. 4,957,968 to Adur et al. teaches an adhesive thermoplastic elastomer which is a blend of a) at least a polyolefin modified by a chemically reactive functional group, b) at least one other polymer, and c) at least one olefinic elastomer, and which is adherent to metal, as well as glass, wood, polyolefins, and polar polymers with no pretreatment or use of other adhesives. U.S. Pat. No. 6,503,984 to Johnson et al. teaches that combinations of a low flexural modulus and low crystalinity polyolefin and a functionalized polyolefin will result in excellent adhesion to metals and polar polymers, especially fibers there from.

SUMMARY OF INVENTION

One aspect of the present invention is directed to a thermoplastic elastomer having adhesion to steels, where the thermoplastic elastomer consists of a) a dynamically crosslinked rubber, b) from more than 2.0 to 10 parts of a metal oxide or salt, and c) from 10 to 200 parts by weight of a functionalized polyolefin having pendant polar functional groups, where the polar functional groups are present at a level of 0.5 to 3.5 mole percent of the total repeating units of said functionalized polyolefin and said functionalized polyolefin is derived from polymerizing at least one monoolefin to form a semicrystalline polymer or is derived from hydrogenating the polydiene blocks of a block copolymer, and where the parts by weight are based on 100 parts by weight of crosslinked rubber. The invention also encompasses steel articles coated with the thermoplastic elastomer and a method of making coated steel articles. The coating can be achieved without the use of an adhesive layer or surface treatment of the steel surface.

DETAILED DESCRIPTION

The present invention is a thermoplastic elastomer (TPE) composition which can adhere to steel surfaces. The components of the invention vary depending on the requirements of the particular application. Components that can be added to the TPE are a rubber phase (usually crosslinked by dynamic vulcanization), an additional one or more semicrystalline functionalized polyolefins with higher flexural modulus, and conventional additives to a hot-melt adhesive or thermoplastic vulcanizate.

The term "steel" is intended to cover steels such as stainless steel and cold-rolled steel, but other steel based compositions are included. For the purposes of this application, "steel" is intended to include a metal alloy whose major component is iron, with carbon being the primary alloying material, although other alloying materials can be employed. This would include steels are iron-carbon alloys with up to 1.5 percent carbon by weight, as well as alloys with higher carbon content, such as cast iron, and the like. There are several classes of steels in which carbon is replaced with other alloying materials, and carbon, if present, is undesired. So, this would include steels are iron-based alloys that can be plastically formed (pounded, rolled, etc.).

The metal oxide and/or salt can be metal oxides such as $ZnO$, $Al_2O_3$, $MgO$, $TiO_2$, $Sb_2O_5$, metal salts such as $Na_2CO_3$, $NaHCO_3$, $CaCO_3$, $MgSO_4$, $CaSO_4$, $Na_2SiO_3$, $AlCl_3$, zinc stearate, and salts of minerals such as Kaolin clay ($Al_2Si_2O_5(OH)_4$) and talc ($Mg_3Si_4O_{10}(OH)_2$), but the preferred metal oxides are zinc oxide ($ZnO$), titanium dioxide ($TiO_2$), and magnesium oxide ($MgO$). The metal oxide and/or salt will be employed by combining the metal oxides and/or the salts in an effective amount, preferably more than 2 phr, with the amount of 3 to 10 phr being further preferred.

The functionalized polyolefin desirably has from 0.5 to 3.5 mole percent functional groups, and more desirably from 1 or 1.5 to 2.0 or 2.5 mole percent functional groups based upon total repeating units in the polymer. The functional groups may be from monomers copolymerized with the olefin monomers or may be added by post-polymerization functionalization such as by grafting unsaturated monomers onto polyolefins as is known in the art. Desirably, at least 70, 80, or 90 weight percent of the repeating units for this polyolefin are olefin monomers of 2 to 8 carbon atoms and more preferably 2 or 3 carbon atoms. For the purposes of this application, functional groups will be defined as groups with heteroatoms other than carbon and hydrogen. Examples of functional groups include carboxylic acid groups, anhydrides from dicarboxylic or polycarboxylic acids, such as the group derived from grafting maleic anhydride to a polyolefin backbone. Preferred groups are carboxylic acid groups or anhydrides of two or more carboxylic acids. Thus the functionalized polyolefin can be a copolymer of acrylic acid and ethylene or propylene; a terpolymer of ethylene, vinyl acetate and acrylic acid; or a terpolymer of ethylene, methyl acrylate, acrylic acid; etc.

The polyolefin which is functionalized to make the functionalized polyolefin is desirably made from monoolefins so that it is compatible with the semicrystalline polyolefin phase. However there are other polymers having hydrogenated blocks made from diolefins (e.g. conjugated dienes having from 4 to 8 carbon atoms) which polymer blocks are chemically indistinguishable from polyolefins polymerized from monoolefins by chemical analysis and have compatibility with the semicrystalline polymers made from monoolefins due to the similarities of their microstructure and their composition. For the purposes of this application these block copolymers with blocks of hydrogenated polydienes will be defined as polyolefins due to their equivalence to conventional polyolefins made from monoolefins. These polymers include homopolymers and block copolymers comprising blocks of polydiene that are subsequently hydrogenated. Blocks of hydrogenated polyisoprene look like perfectly random copolymers of ethylene and propylene. Blocks of hydrogenated polybutadiene look like copolymers of 1,2-butylene and ethylene. Commercially available hydrogenated blocky copolymers of dienes and styrene can function as the starting material for functionalized polyolefins due to the equivalence of the hydrogenated diene blocks to a polyolefin made from monoolefins. The polymer backbone of the functionalized material can also be a maleic anhydride modified hydrogenated styrene/butadiene/styrene (SBS) and/or hydrogenated styrene/butadiene/styrene (SEBS).

When the functionalized polyolefin is used in a thermoplastic vulcanizate (TPV) it is desirably used in an amount from 10 or 15 to 200 parts by weight, more desirably from 15 or 20 to 100 or 200 and preferably from 40 to 80 parts by weight per 100 parts by weight of rubbers in the TPV. It is also desirable that the functionalized polyolefin be present in an amount from 10 to 60 parts by weight and more desirably from 12.5 to 50 parts by weight per 100 total parts of polyolefin in the thermoplastic phase. When the functionalized polyolefin is used in a non-TPV application, it is desirably present in an amount from 5 to 60 parts by weight and more desirably from 10 to 50 parts by weight per 100 parts by weight total polyolefins.

The rubber component can be any rubber suitable for use in a thermoplastic vulcanizate. These rubbers include ethylene-propylene-diene rubber (EPDM) (e.g. copolymer of two or more alpha-monoolefins in weight ratios of 25:75 to 75:25 [if three or more monoolefins are used the then two have to be each be present in an amount of at least 25 weight percent of the total] with 0.2 to 10 wt % of repeating units from a polyene with 5 to 15 carbon atoms based on the weight of the EPDM); various isobutylene copolymers such as butyl rubber copolymers of isobutylene and p-methylstyrene, butyl rubber copolymers of isobutylene and a diene (including brominated and chlorinated versions), and copolymers or terpolymers of isobutylene and divinyl aromatic monomers; natural rubber; homopolymers of conjugated dienes having from 4 to 8 carbon atoms, optionally including halogens, such as polybutadiene, synthetic isoprene, and chloroprene rubber; or copolymers having at least 50 weight percent repeating units from said conjugated dienes, such as styrene-butadiene rubber and/or nitrile rubber: and combinations thereof.

The rubber component can include rubber processing oils and/or extender oils, as is known in the art. The rubber processing oils generally are paraffinic, naphthenic or aromatic oils derived from petroleum fractions. The type will be that ordinarily used in conjunction with the specific rubber or rubbers present in the composition, and the quantity of processing oil based on the total rubber content of the thermoplastic elastomer may range from zero or 50 to several hundred parts by weight per hundred parts by weight of rubber. The efficiency of the catalyst may depend upon the quality of the oils and other additives contain no or very low concentrations of compounds that interfere with the activity of the catalyst. These include phosphines, amines, sulfides or other compounds that may be classified as Lewis bases.

While the description above is generally adequate for the rubbers in general in thermoplastic vulcanizates, in some embodiments using hydrosilylation crosslinking the preferred rubbers are as set forth below. The preferred rubbers are those with residual carbon to carbon double bond unsaturation that is pendant to the polymer backbone and sterically unhindered with respect to reaction with the hydrosilylation crosslinking agent. Preferred rubbers with such sterically unhindered bonds react quickly with low concentrations of hydrosilylation crosslinking agent and low concentrations of catalyst.

Preferred rubbers for hydrosilylation crosslinking include rubbers from two or more α-monoolefins, copolymerized with a polyene, usually a non-conjugated diene such as EPDM rubber, previously described. Useful polyenes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB) and the like, or a combination thereof. 5-vinyl-2-norbornene (VNB) is a preferred polyene in EPDM for hydrosilylation crosslinking.

Another preferred rubber for hydrosilylation crosslinking is a copolymer or terpolymer of isobutylene and divinyl aromatic compounds. These polymers desirably comprise from 94 to 99 or 99.5 weight percent repeating units from isobutylene, from 0 or 0.5 to 3 or 5 weight percent repeating units from a conjugated diene and from 0.5 to 3 or 5 weight percent repeating units from a divinyl aromatic monomer having the formula

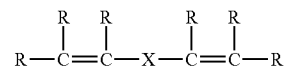

wherein X is an aromatic (aryl) or an alkyl substituted aromatic moiety, and each R may be the same or different and is selected from hydrogen or a C1-5 alkyl. Divinyl benzene is a preferred example of the above divinyl aromatic monomer.

Another preferred rubber is a copolymer of isobutylene and para-methylstyrene which is post-polymerization functionalized with a halogen on the paramethyl group and then functionalized by replacing the halogen with an acrylic or alkacrylic group. This type of substitution chemistry on copolymers of isobutylene and para-methylstyrene is known in the art. This addition of the acrylic or alkacrylic group is well known to the art and involves the reaction of

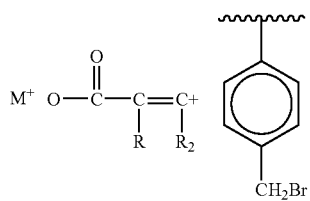

where M+ is a metal ion such as Na+ or K+ and Br is bromine, an example of a halogen, the remainder of the isobutylene-paramethylstyrene is represented by the squiggly line, and each R group is independently H or an alkyl or alkylene of 1 to 4 carbon atoms. The product is

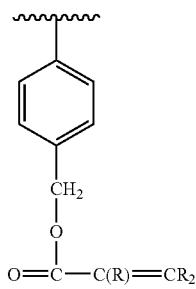

The curative or crosslinking system for the rubber can be any system conventionally used for thermoplastic vulcanizates. These include peroxide, azide, sulfur, phenolic resin and accelerated sulfur-vulcanizing agents. The combination of maleimide and disulfide accelerator can be used. Other curatives such as those used for butyl rubber include sulfur, phenolic resin, metal oxide, p-quinone dioxime, or bis-maleimide vulcanizing system. Halogenated butyl rubbers can be crosslinked with zinc oxide. The curatives or crosslinking systems are used in conventional amounts for crosslinking the rubber based upon the weight of the rubber component.

Alternatively, the crosslinking system can comprise a hydrosilylation crosslinking system. Preferred silicon hydride compounds (hydrosilylation crosslinkers) include compounds of the formula

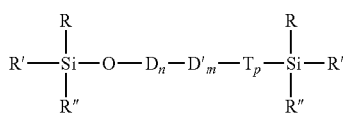

wherein each R is independently selected from the group consisting of alkyls comprising 1 to 20 carbon atoms, cycloalkyls comprising 4 to 12 carbon atoms and aryls. In formula (1) it is preferred that each R be independently selected from a group consisting of alkyls comprising 1 to 6 carbon atoms. Even more preferred is R=methyl, R' represents a hydrogen atom, an alkyl or alkoxy group having from 1 to 24 carbon atoms. R" represents R or a hydrogen atom.

D represents the group

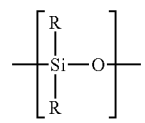

D' represents the group

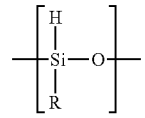

T represents the group $$\left[\begin{array}{c} O \\ | \\ Si-O \\ | \\ R'' \end{array}\right]$$

m is an integer having a value ranging from 1 to 50, n is an integer having a value ranging from 1 to 50, and p is an integer having a value ranging from 0 to 6.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is known in which involves alkylation of polyorganosiloxanes. The weight percent of alkylation should be limited to a level that permits adequate reaction rates and minimizes steric constraints.

The amount of silicon hydride compound useful in the process of the present invention can range from 0.1 to 10.0 mole equivalents of SiH per mole of carbon-carbon double bond in the rubber, and preferably is in the range of 0.5 to 5.0 mole equivalents of SiH per carbon-carbon double bond in the rubber component of the thermoplastic elastomer.

It has generally been understood that any hydrosilylation catalyst, or catalyst precursor capable of generating a catalyst in situ, which will catalyze the hydrosilylation reaction with the carbon-carbon bonds of the rubber, can be used. Such catalysts have included transition metals of Group VIII such as palladium, rhodium, platinum and the like, including complexes of these metals. Chloroplatinic acid has been disclosed as a useful catalyst; where the catalyst may be used at concentrations of 5 to 10,000 parts per million parts by weight rubber and 100 to 200,000 parts per million parts by weight rubber, respectively.

Significantly lower concentrations of platinum-containing catalyst can be used, while obtaining improvement in both the speed of the reaction and the efficiency of the crosslinking. Concentrations of catalyst in the range of 0.01 to 20, 40 or 50 parts per million parts by weight of rubber, expressed as platinum metal, in combination with a diene-containing rubber having carbon-carbon multiple bonds which are predominately sterically unhindered, are effective in rapidly and completely curing the rubber in the process of dynamically vulcanizing blends of thermoplastic resin and rubber. Catalyst concentrations of 0.1 to 4 or 40 parts per million by weight expressed as platinum metal, and based on the weight of rubber, are particularly preferred.

Platinum-containing catalysts, which are useful in the process of the invention, are well known in the art. These catalysts include chloroplatinic acid with symdivinyltetramethyldisiloxane, dichloro-bis (triphenylphosphine) platinum (II), cis-dichloro-bis (acetonitrile) platinum (II), dicarbonyldichloroplatinum (II), platinum chloride and platinum oxide. Zero valent platinum metal complexes such as Karstedt's catalyst are particularly preferred.

In order for the catalyst to function most efficiently in the dynamic vulcanization environment, it is useful that it is inherently thermally stable, or that its activity is inhibited to prevent too rapid a reaction or catalyst decomposition. Appropriate catalyst inhibitors that are suitable to stabilize the platinum catalyst at high temperature include 1,3,5,7-tetravinyltetramethylcyclotetrasiloxane and its higher analogs such as vinyl cyclic pentamer. However, other olefins that are stable above 165° C. are also useful. These include maleates, fumarates and the cyclic pentamer. It is also particularly preferred in the invention to use a catalyst that remains soluble in the reaction medium.

The thermoplastic elastomer may contain conventional additives, which can be introduced into the composition in the thermoplastic resin, the rubber, or in the blend before, during or after curing. Examples of such additives are antioxidants, processing aids, reinforcing and non-reinforcing fillers, pigments, waxes, rubber processing oil, extender oils, antiblocking agents, antistatic agents, ultraviolet stabilizers, plasticizers (including esters), foaming agents, flame retardants and other processing aids known to the rubber compounding art. Such additives may comprise from 1 to 300 percent by weight based on the weight of the total polyolefins and rubber in the final thermoplastic elastomer product. Fillers and extenders, which can be utilized, include conventional inorganics such as calcium carbonate, clays, silica, talc, titanium dioxide, carbon black and the like. The rubber processing oils generally are paraffinic, naphthenic or aromatic oils derived from petroleum fractions. The type will be that ordinarily used in conjunction with the specific rubber or rubbers present in the composition, and the quantity of processing oil based on the total rubber content of the thermoplastic elastomer may range from zero or 50 to several hundred parts by weight per hundred parts by weight of rubber.

The rubber component of the thermoplastic elastomer is generally present as small, i.e. micron-size particles within a continuous thermoplastic resin matrix, although a co-continuous morphology or a phase inversion is also possible depending upon the amount of rubber relative to plastic and the degree of cure of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as multiple-roll roll mills, Banbury mixers, Brabender mixers, continuous mixers, mixing extruders and the like. Generally after a reasonably homogenous mixture of the two phases is established, the curatives are added. Mixing is continued until maximum mixing torque is reached. Thereafter mixing is continued one or two minutes. The unique characteristics of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

It is preferred to prepare a dynamic vulcanizate as described above when using peroxide, sulfur, and the phenolic curatives. Peroxide curatives may cause some chain scission of polyolefins. The functionalized polyolefin is generally, but not necessarily, added after curing the rubber phase, to avoid any chemical interaction between the curative and the functional groups of the functionalized polyolefin. The addition of the functionalized polyolefin can occur in the same equipment or separate equipment from the preparation of the thermoplastic vulcanizate. The polyolefin with the low crystallinity and low flexural modulus can be added in any stage of the processing, e.g. before or after curing the rubber phase. Commercial thermoplastic vulcanizates can be converted to thermoplastic vulcanizates with excellent adhesion to textile fibers, by adding during melt blending appropriate amounts of functionalized polyolefin and polyolefin with low crystallinity and low flexural modulus.

As the hydrosilylation crosslinking system does not appreciably react with maleic anhydride functionalized polyolefin, the functionalized polyolefin can be added before the crosslinking (curing) step eliminating the extra addition step after crosslinking.

The hot melt adhesive or the thermoplastic vulcanizate of this disclosure adheres well to metal substrates, preferably steel substrates. Thus they may be used as a coating on steel parts, sheets, or fibers (wires) or used to form molded or shaped parts that include metal such as sheets or wires as part of or adhered to a molded or shaped article. Examples of products formed with these thermoplastic vulcanizates include covers for hydraulic hoses, tube and cover for fire fighting hoses, belting, roofing, etc. The steel substrates can be composites with a steel surface and blends and alloys of steel, such as stainless steel, cold rolled steel, and the like.

The bonding process employed is typical for applying coatings to metal surfaces. In the bonding process, it is preferred to pre-heat the metal surface to more than 100° C. to achieve strong bonding. The pre-heating is a preferred embodiment.

The bonding process may be any means to form a composite article, such as insert injection molding, extrusion, and compression molding. No surface treatment of metals was conducted for making any of the composite articles in the Examples. During the bonding process, elevating the temperature of metal substrates usually results in higher bonding strength. Metal substrates with suitable surface treatment such as anodization generally results in higher bonding strength. Alternatively, these treated surfaces require lower temperature to reach the same bonding strength as the untreated metal surfaces.

Thus, one aspect of the invention provides a process for bonding a thermoplastic vulcanizate to a metal surface of an article to form a composite article comprising the steps of contacting the metal surface with a thermoplastic vulcanizate in molten form, followed by forming the thermoplastic vulcanizate into a desired shape, preferably a shape such that it conforms with the metal surface and intimately contacts the surface. The thermoplastic vulcanizate is subsequently cooled. Preferably, the vulcanizate comprises; a crosslinked rubber, from more than 2 to 10 parts by weight of a metal oxide or salt, and from 10 to 200 parts by weight of a functionalized polyolefin having pendant polar functional groups, wherein said polar functional groups are present at a level of 0.5 to 3.5 mole percent of the total repeating units of said functionalized polyolefin and said functionalized polyolefin is derived from polymerizing at least one monoolefin to form a semicrystalline polymer or is derived from hydrogenating the polydiene blocks of a block copolymer, wherein said parts by weight are based upon 100 parts by weight of crosslinked rubber. Preferably, the article comprises a steel surface.

In one embodiment, the bonding is carried out without a surface treatment of the metal surface. Thus, the composite article is preferably formed by directly bonding the thermoplastic elastomer to the metal surface of the article. Thus, in a preferably embodiment the composite article consists essentially of the article having a metal surface and the thermoplastic elastomer.

In one embodiment, at least the metal surface is heated prior to bonding the vulcanizate, preferably at a temperature greater than 40° C., more preferably greater than 50° C., and most preferably greater than 60° C. The heating may take place at any time, preferably prior to contacting the metal with the thermoplastic vulcanizate.

Thus, one aspect of the invention is to the use of a thermoplastic vulcanizate to form a composite article comprising contacting the metal surface of an article with a molten thermoplastic vulcanizate to form a composite article, wherein said thermoplastic vulcanizate comprises a crosslinked rubber, from more than 2 to 10 parts by weight of a metal oxide or salt, and from 10 to 200 parts by weight of a functionalized polyolefin having pendant polar functional groups, wherein said polar functional groups are present at a level of 0.5 to 3.5 mole percent of the total repeating units of said functionalized polyolefin and said functionalized polyolefin is derived from polymerizing at least one monoolefin to form a semicrystalline polymer or is derived from hydrogenating the polydiene blocks of a block copolymer, wherein said parts by weight are based upon 100 parts by weight of crosslinked rubber.

EXAMPLES

Table 1 shows the formulations and physical and bonding properties for 6 examples. Examples 1-3 show the surprising effect of ZnO on SS bonding. These results were verified by repeating Examples 1-3. The reproducibility of the data confirmed the beneficial results. Examples 2 and 2 (Repeats) are similar to a commercial product 8291-85TL, available from Advanced Elastomer Systems, Akron, Ohio.

All ingredients in the formulations were kept constant except ZnO level. The TPV's were made in a Brabender mixer at 180° C. and 150 rpm. For each example, 2 coupons on aluminum foil and two coupons on 304 stainless steel foil were molded and subsequently tested for adhesion.

All the coupons for adhesion testing were compression molded on a Wabash press at 425° F. (upper platen)/400° F. (lower platen). The metal foils were placed on the bottom of the TPV. The dimension of the specimen was 1 inch×4.5 inch. A 1 inch×1 inch area of the foil was covered with Teflon tape so that the peeling test could be started. Heating time was 5 minutes, followed by 10 minutes to water cooling. The bonding strength were tested on a Monsanto T-10 instrument. All of the physical testing was in accordance with ASTM International testing, including ASTM D-2240 (Hardness) and ASTM D-638 (Tensile Strength, Elongation, and 100% Modulus)

The dramatic increase of bonding strength to stainless steel (SS) upon increasing ZnO amount can be clearly seen. On the other hand, mechanical properties do not exhibit drastic changes.

TABLE 1

|  | COMP. EX. 1 | COMP. EX. 2 (85TL) | EX. 3 | COMP. EX. 1 (REPEAT) | COMP. EX. 2 (REPEAT) | EX. 3 (REPEAT) |
| --- | --- | --- | --- | --- | --- | --- |
| EPDM | 200 | 200 | 200 | 200 | 200 | 200 |
| Anhydrous Aluminum Silicate Clay | 12 | 12 | 12 | 12 | 12 | 12 |
| ZnO | 0 | 2 | 8 | 0 | 2 | 8 |
| Random Copolymer with High Ethylene Content | 85.2 | 85.2 | 85.2 | 85.2 | 85.2 | 85.2 |
| Polypropylene Random Copolymer with 1.5% Maleation | 63.9 | 63.9 | 63.9 | 63.9 | 63.9 | 63.9 |
| Thermoplastic Olefin Resin | 63.9 | 63.9 | 63.9 | 63.9 | 63.9 | 63.9 |
| Platinum Catalyst Solution | 2.5 | 2.5 | 2.5 | 2.5 | 2.5 | 2.5 |
| Silicone Hydride | 3 | 3 | 3 | 3 | 3 | 3 |
| Hardness, Shore A | 83 | 82.5 | 82.5 | 82 | 83 | 83 |
| Tensile Strength, psi | 1155 | 1172 | 1193 | 1099 | 1307 | 1105 |
| Elongation, % | 472 | 511 | 510 | 468 | 542 | 435 |
| 100% Modulus, psi | 664 | 690 | 700 | 691 | 708 | 709 |
| Bonding on Al (pli), coupon #1 | 28 | 25 | 25 | 41^ | 25 | 20 |
| Bonding on Al (pli), coupon #2 | 31 | 30 | 19 | 48^ | 50^ | 24 |
| Bonding on SS (pli), coupon #1 | 17 | 35^ | 77* | 19 | 20 | 73* |

TABLE 1-continued

|  | COMP. EX. 1 | COMP. EX. 2 (85TL) | EX. 3 | COMP. EX. 1 (REPEAT) | COMP. EX. 2 (REPEAT) | EX. 3 (REPEAT) |
|---|---|---|---|---|---|---|
| Bonding on SS (pli), coupon #2 | 17 | 47^ | 75* | 20 | 24 | 75* |

Note:
"*" denotes a full cohesive failure (by visual estimate, >40% of peeled area failed cohesively).
"^" denotes a slight cohesive failure (by visual estimate, <40% of peeled area failed cohesively).
Bonding strength numbers without these marks are full adhesive failure.

EPDM rubbers are available from ExxonMobil Chemicals under its Vistalon brand, such as Vistalon VX1696 EPDM rubber. Maleic anhydride functionalized polypropylene random copolymer is available as Fusabond PMD353D which is advertised as being 1.5% by weight grafted maleic anhydride by its manufacturer DuPont Canada, Inc. Anhydrous aluminum silicate clay is available from Burgess Pigment Company, Sandersville, Ga. as Icecap K clay. A random copolymer with a high ethylene content is available as Fina EOD 94-21 from AtoFina. A platinum catalyst solution is available as PC085 in which the catalyst is combined with cyclic vinylsiloxane in oil. Silicone hydride is available from Dow Corning at DC 2-5084 SiHi. Thermoplastic olefin resin is available from Basell as Adflex KS359P. Magnesium oxide is available as Maglite D magnesium oxide.

Table 2 shows the formulations and physical and bonding properties for 5 examples. Comparative Example 2 is a commercial 8291-85TL formulation.

All ingredients in the formulations were kept constant except metal oxides level. The TPV's were made in a Brabender mixer at 180° C. and 150 rpm. For each example, 2 coupons on Al foil and two coupons on 304SS foil were molded and subsequently tested for adhesion.

All the coupons for adhesion testing were compression molded on a Wabash press at 425° F. (upper platen)/400° F. (lower platen). Heating time was 5 minutes, followed by 10 minutes of water cooling. The bonding strength were tested on a Monsanto T-10 instrument.

The dramatic increase of bonding strength to stainless steel (SS) by using different metal oxides and increasing ZnO amount can be clearly seen. On the other hand, mechanical properties do not exhibit drastic changes.

TABLE 2

|  | EX. 4 | EX. 5 | EX. 6 | EX. 7 | COMP. EX. 2 (REPEAT) |
|---|---|---|---|---|---|
| EPDM Rubber | 200 | 200 | 200 | 200 | 200 |
| Anhydrous Aluminum Silicate Clay | 12 | 12 | 12 | 12 | 12 |
| ZnO | 4 | 2 |  |  | 2 |
| TiO2 |  | 2 |  |  |  |
| MgO |  |  | 2 | 8 |  |
| Random Copolymer with High Ethylene Content | 85.2 | 85.2 | 85.2 | 85.2 | 85.2 |
| Polypropylene Random Copolymer with 1.5% Maleation | 63.9 | 63.9 | 63.9 | 63.9 | 63.9 |
| Thermoplastic Olefin Resin | 63.9 | 63.9 | 63.9 | 63.9 | 63.9 |
| Platinum Solution | 2.5 | 2.5 | 2.5 | 2.5 | 2.5 |
| Silicone Hydride | 3 | 3 | 3 | 3 | 3 |
| Hardness, Shore A | 81.5 | 82 | 83 | 83.5 | 83 |
| Tensile Strength, psi | 1265 | 1046 | 1229 | 1059 | 1307 |
| Elongation, % | 536 | 396 | 512 | 394 | 542 |
| 100% Modulus, psi | 703 | 698 | 698 | 726 | 708 |
| Bonding on Al (pli), coupon #1 | 28 | 32^ | 22 | 14 | 25 |
| Bonding on Al (pli), coupon #2 | 39^ | 40^ | 18 | 14 | 50^ |
| Bonding on SS (pli), coupon #1 | 52* | 80* | 40^ | 40^ | 20 |
| Bonding on SS (pli), coupon #2 | 78* | 73* | 67* | 58* | 24 |

Note:
See notes for Table I.

Table 3 shows further examples which were processed similar to Example 1 and which show formulations without curatives, bond retention in water, i.e., subjected to 1 week room temperature de-ionized water immersion, and the use of other metal salts.

TABLE 3

| | Comp. Ex. 2 (Repeat) | Ex. 9 | Ex. 10 | Ex. 11 |
|---|---|---|---|---|
| EPDM Rubber | 200 | 200 | 200 | 200 |
| Anhydrous Aluminum Silicate Clay | 12 | 12 | 12 | 12 |
| ZnO | 2 | 8 | 0 | 0 |
| $CaCO_3$ | 0 | 0 | 8 | 0 |
| $NaHCO_3$ | 0 | 0 | 0 | 8 |
| Random Copolymer with High Ethylene Content | 85.2 | 85.2 | 85.2 | 85.2 |
| Polypropylene Random Copolymer with 1.5% Maleation | 63.9 | 63.9 | 63.9 | 63.9 |
| Thermoplastic Resin Olefin | 63.9 | 63.9 | 63.9 | 63.9 |
| Platinum Solution | 2.5 | 2.5 | 2.5 | 2.5 |
| Silicone Hydride | 3 | 3 | 3 | 3 |
| Bonding on Al (pli) | | | 65* | 40^ |
| Bonding on SS (pli) | | | 67* | 68* |
| Bonding on Al (pli), Initial | 25 | 35^ | | |
| Bonding on SS (pli), Initial | 38 | 63^ | | |
| Bonding on SS (pli), 1 Week Water Aged | 19 | 45^ | | |
| Hardness, Shore A | | | 84 | 83 |
| Tensile Strength (psi) | | | 989 | 1057 |
| Elongation (%) | | | 432 | 397 |
| 100% Modulus (psi) | | | 685 | 697 |

Note:
See notes for Table I.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. A thermoplastic elastomer having adhesion to steels, said thermoplastic elastomer comprising:
    a) a hydrosilation dynamically crosliniked rubber,
    b) from 2.0 to 10 parts of ZnO or a metal salt selected from the group consisting of $CaCO_3$ and $NaHCO_3$, and
    c) from 10 to 200 parts by weight of a functionalized polyolefin having pendant polar functional groups, wherein said polar functional groups are present at a level of 0.5 to 3.5 mole percent of the total repeating units of said functionalized polyolefin and said functionalized polyolefin is derived from polymerizing at least one monoolefin to form the polyolefin or is derived from hydrogenating the polydiene blocks of a block copolymer, and
    wherein said parts by weight are based on 100 parts by weight of crosliniked rubber.

2. A thermoplastic elastomer according to claim 1, wherein said ZnO or a metal salt is present in an amount of more than 3 parts by weight.

3. A thermoplastic elastomer according to claim 2, wherein said pendant polar functional groups are derived from grafting maleic anhydride to a polyolefin backbone or to a hydrogenated polydiene block.

4. A thermoplastic elastomer according to claim 1, wherein said crosslinked rubber comprises an EPDM rubber or a polymer derived from polymerizing isobutylene and at least one other monomer or combinations thereof.

5. A thermoplastic elastomer according to claim 1, wherein said crosslinked rubber comprises natural rubber, a homopolymer of a conjugated diene, or a copolymer having at least 50 weight percent repeat units from a conjugated diene, or combinations thereof.

6. A process for bonding a thermoplastic vulcanizate to a metal surface of an article to form a composite article comprising the steps of:
    a) contacting the metal surface with a thermoplastic vulcanizate in molten form,
    b) forming said thermoplastic vulcanizate into a desired shape and,
    c) subsequently cooling said thermoplastic vulcanizate;
    wherein said thermoplastic vulcanizate comprises;
        i) a crosliniked rubber formed from a hydrosilation crosslinking system,
        ii) from 2 to 10 parts by weight of ZnO or a metal salt selected from the group consisting of $CaCO_3$ and $NaHCO_3$, and
        iii) from 10 to 200 parts by weight of a functionalized polyolefin having pendant polar functional groups, wherein said polar functional groups are present at a level of 0.5 to 3.5 mole percent of the total repeating units of said functionalized polyolefin and said functionalized polyolefin is derived from polymerizing at least one monoolefin to form the polyolefin or is derived from hydrogenating the polydiene blocks of a block copolymer, wherein said parts by weight are based upon 100 parts by weight of crosliniked rubber.

7. The process of claim 6 further comprising preheating the metal surface to a temperature greater than 50° C. prior to contacting the metal with the thermoplastic vulcanizate.

8. The process of claim 6 wherein the bonding is carried out without a surface treatment of the metal surface.

9. The process of claim 6 wherein the metal surface is heated prior to bonding the vulcanizate.

10. A composite article having the thermoplastic elastomer of claim 1 adhered thereto.

11. The composite article of claim 10 wherein the composite article is formed by directly bonding the thermoplastic elastomer to the metal surface of the article.

12. The composite article of claim 10 wherein the composite article consists essentially of the article having a metal surface and the thermoplastic elastomer.

13. A thermoplastic elastomer according to claim 1, where the thermoplastic elastomer comprises more than 3 parts by weight ZnO per 100 parts by weight of cross-linked rubber.

14. A thermoplastic elastomer according to claim 1, where the thermoplastic elastomer comprises from 40 to 80 parts by weight of the functionalized polyolefin per 100 parts by weight of the cross-linked rubber.

* * * * *

UNITED STATES PATENT AND TRADEMARK OFFICE
CERTIFICATE OF CORRECTION

PATENT NO. : 7,645,832 B2  Page 1 of 1
APPLICATION NO. : 11/371030
DATED : January 12, 2010
INVENTOR(S) : Hu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Sixteenth Day of November, 2010

David J. Kappos
*Director of the United States Patent and Trademark Office*